Figure 1:
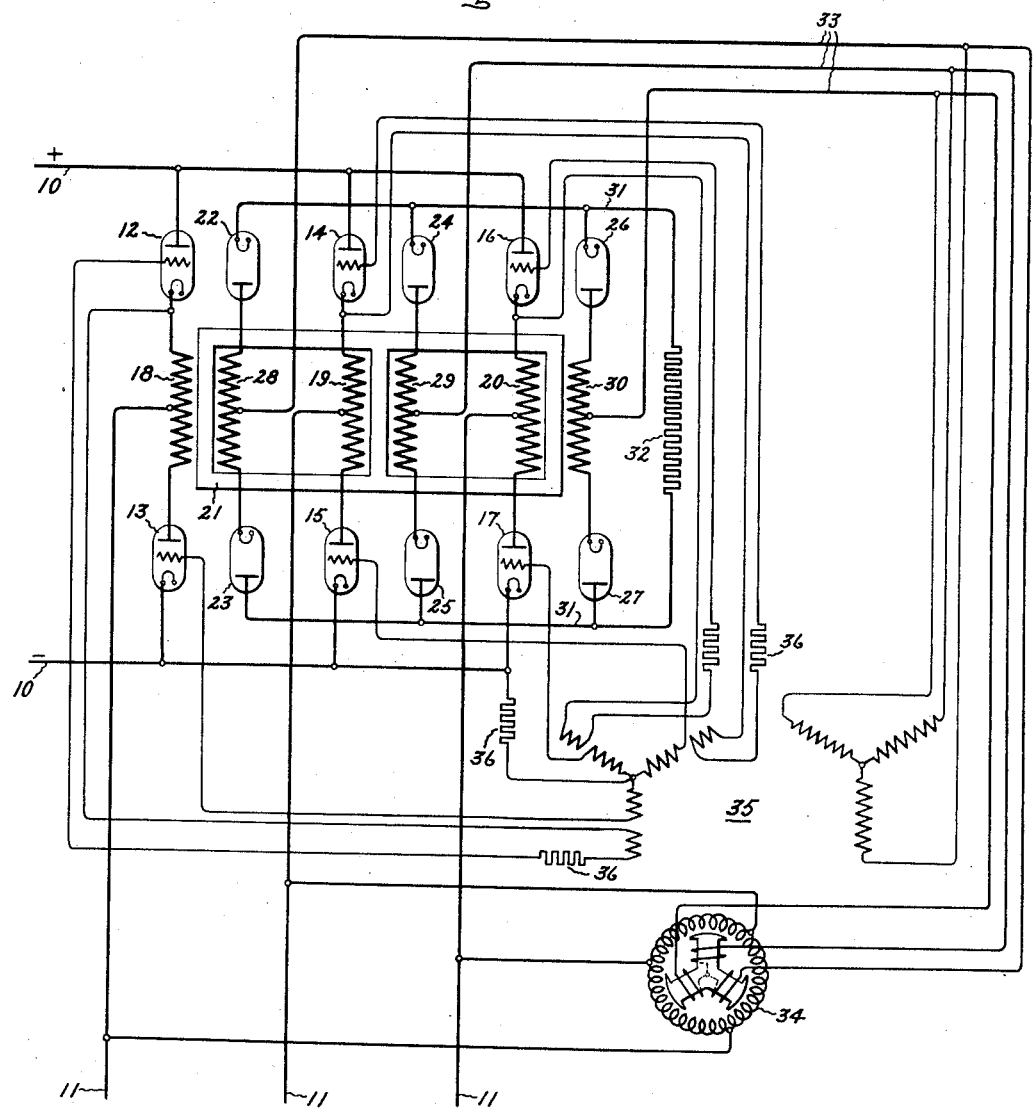

Patented Oct. 10, 1933

1,929,565

UNITED STATES PATENT OFFICE 1,929,565

ELECTRIC VALVE CONVERTING APPARATUS

Camil A. Sabbah, Schenectady, N. Y., assignor to General Electric Company, a corporation of New York Application October 1, 1931. Serial No. 566,377

12 Claims. (Cl. 175—363)

My invention relates to electric valve converting apparatus and more particularly to such apparatus adapted to transmit energy between direct and alternating current circuits or between alternating current circuits of different power factors or frequencies.

Heretofore, there have been devised numerous apparatus including electric valves for transmitting energy between direct and alternating current circuits or alternating current circuits of different frequencies. When operating such apparatus as a rectifier, transmitting energy from an alternating current circuit to a direct current circuit, it has been customary to control the average voltage of the direct current circuit by retarding the phase of the grid potentials of the several electric valves with respect to their anode potentials. The effect of this type of control is to draw a lagging current from the alternating current circuit, while on the other hand it is usually preferable to draw a leading current in order to improve the power factor of the system. In the majority of the arrangements of the prior art, however, it has not been possible to operate such a controlled rectifier at leading power factors, since this type of operation involves the transfer of the load current from one valve to the next succeeding valve in opposition to the electromotive force of the inductive winding interconnecting the valves. On the other hand, when operating such apparatus as an inverter, transmitting energy from a direct current circuit to an alternating current circuit, it has not been possible ordinarily to supply lagging loads on the alternating current circuit without the provision of an inordinate amount of commutating capacitance. This is due to the fact that a lagging power factor on the alternating current circuit corresponds to a transfer of load between the several electric valves at points in the cycle of alternating potential when the counter electromotive force of the inductive winding connected between the valves opposes such commutation. The same principles apply when transmitting energy from an alternating current circuit of one frequency to an alternating current circuit of another frequency or the same frequency. In many cases, however, it is desirable to supply a lagging power factor alternating current load by means of an electric valve converting apparatus.

It is an object of my invention, therefore, to provide an improved electric valve converting apparatus for transmitting energy between a load circuit and a supply circuit, one of said circuits being an alternating current circuit, under any desired power factor conditions on the alternating current circuit.

It is another object of my invention to provide an improved electric valve converting apparatus for transmitting energy from a direct current circuit to an alternating current load circuit under lagging power factor conditions on the alternating current circuit.

It is a further object of my invention to provide an improved electric valve converting apparatus for transmitting energy from an alternating current circuit to a direct current circuit which is capable of drawing a leading power factor current from the alternating current circuit.

It is a still further object of my invention to provide an improved electric valve converting apparatus which is capable of transmitting energy from an alternating current supply circuit to an alternating current load circuit of the same or a sub-multiple frequency in which energy may be taken from the supply circuit at approximately unity power factor and be delivered to the load circuit at any desired power factor.

In accordance with my invention, when transmitting energy between a direct and an alternating current circuit, the circuits are interconnected by means of an electric valve converting apparatus including an interphase transformer winding and there is also provided a source of periodic potential for exciting the interphase transformer to commutate the current between the several valves. This source of commutating potential may be derived from an auxiliary electric valve converting apparatus energized from the alternating current circuit or from a source of alternating current synchronous therewith. The auxiliary electric valve converting apparatus is connected similarly to the main converting apparatus and is provided with an interphase transformer winding coupled with that of the main converting apparatus. The grids of the main valve converting apparatus are controlled substantially in phase with the valve currents of the auxiliary electric converting apparatus. Under such conditions, the interphase transformer winding of the main converting apparatus is excited with the interphase voltage of the auxiliary converting apparatus which has the proper phase relation to provide a commutating potential for commutating the load current between the several electric valves under any desired power factor conditions on the alternating current circuit. When transmitting energy between two alternating current circuits of the same frequency, or of different frequencies, at different power factors, the auxiliary valve converting apparatus is concatenated with the main converting apparatus so that the output of the so-called auxiliary converting apparatus may be utilized to energize the main valve converting apparatus.

Figure 2:
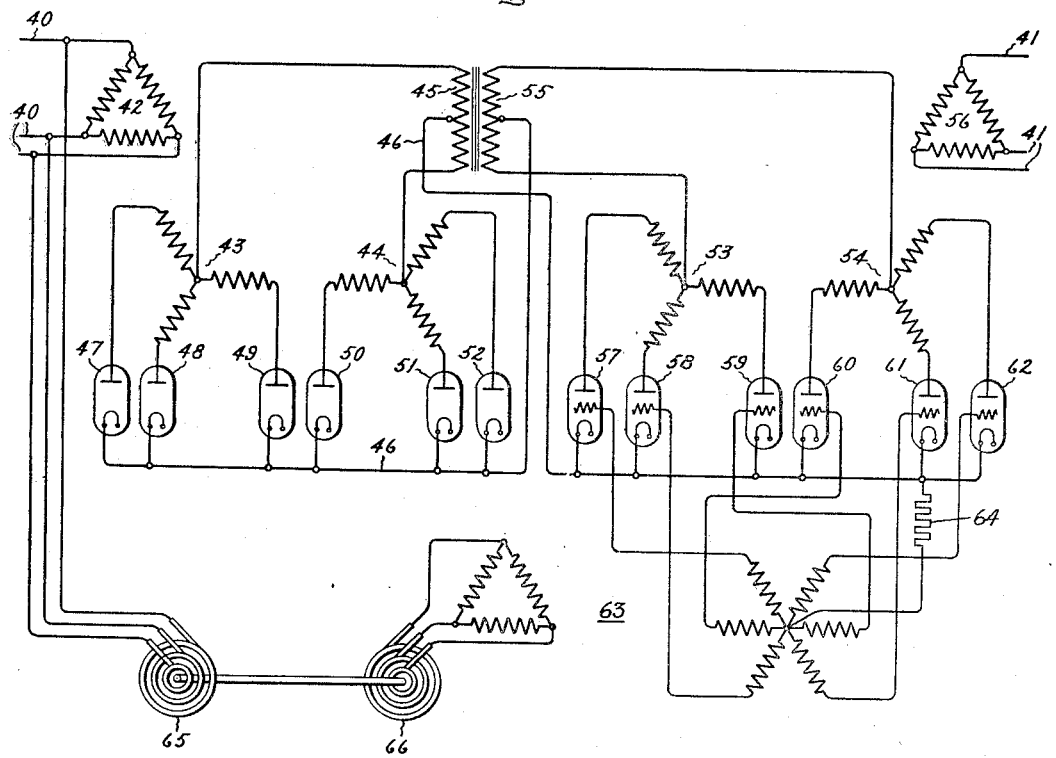

For a better understanding of my invention, together with other and further objects thereof, reference is had to the following description taken in connection with the accompanying drawings and its scope will be pointed out in the appended claims. Fig. 1 of the drawings illustrates my invention as applied to an arrangement for transmitting energy between direct and alternating current circuits under any desired power factor conditions on the alternating current circuit, while Fig. 2 illustrates a modification of my invention for transmitting energy between two alternating current circuits of the same frequency or of different frequencies.

Referring now to Fig. 1 of the drawings, there is illustrated an arrangement for transmitting energy between a direct current circuit 10 and a three-phase alternating current circuit 11. This apparatus comprises three pairs of electric valves 12 and 13, 14 and 15, and 16 and 17, respectively, interconnected through the interphase transformer windings 18, 19 and 20, respectively, wound on a three-phase magnetic core 21. As illustrated, the windings 18, 19 and 20 are each provided with an electrical midpoint connected to one line of the alternating current circuit 11; although, if it is desired to secure a voltage transformation between the circuits 10 and 11, these electrical midpoints may be connected to the low voltage winding of a polyphase transformer. However, it is to be understood that the above described valve converting apparatus per se forms no part of my present invention but is disclosed and broadly claimed in my copending application Serial No. 430,735, filed February 24, 1930, and assigned to the same assignee as the present application. In order to provide periodic potentials for commutating the current between the several valves under non-unity power factor conditions on the alternating current circuit 11, there is provided an auxiliary valve converting apparatus comprising three pairs of electric valves 22 and 23, 24 and 25, and 26 and 27, interconnected through the interphase transformer windings 28, 29 and 30, respectively. The interphase windings 28, 29 and 30 are inductively coupled with the interphase windings 18, 19 and 20, respectively, and are each provided with an electrical midpoint connected to one terminal of the alternating current circuit 33. The direct current circuit 31 of the auxiliary converting apparatus may be loaded on a suitable resistor 32, or, if desired, may be connected to the direct current circuit 10 to feed back energy thereto. Each of electric valves 12—17 inclusive and 22—27 inclusive are provided with an anode and a cathode and may be of any of the several types well known in the art although I prefer to use valves of the vapor electric discharge type. In addition, the valves 12—17 inclusive are each provided with control grids for determining the voltage ratio between the direct current circuit 10 and the alternating current circuit 11 and the power factor conditions on the alternating current circuit 11. The alternating current circuit 33 from which the auxiliary valve converting apparatus is energized may be connected to the alternating current circuit 11 through a rotary phase-shifting transformer 34 or, in case the alternating current circuit 11 is not connected to an independent source of electromotive force, the circuit 33 may be energized from any suitable source of alternating current of the frequency which it is desired to supply to the circuit 11. The grids of the several electric valves 12—17 inclusive are excited from the alternating current circuit 33 through a suitable grid transformer 35, the secondary winding of which is provided with insulated phase windings for exciting the grids of those valves having independent cathode potentials. Current limiting resistors 36 are preferably included in the several grid circuits.

The operation of the electric valve converting apparatus of the type described above may be found explained in detail in my copending application referred to above. In brief, neglecting leakage reactance, the several interphase windings, 18, 19, and 20 and 28, 29 and 30 serve to maintain the total magnetomotive force of each of the arms of the magnetic member 21 at a constant value. In order to satisfy this condition and the conditions that all the current flowing into one side of the direct current circuit must equal that flowing from the other side, it has been found that each of the electric valves is conductive for 240 electrical degrees of each cycle, the valves becoming conductive and non-conductive in a definite sequence. As pointed out in the above mentioned application, such an apparatus has the advantage, among others, that short circuit due to the failure of a single electric valve is positively eliminated. The commutation of the current between the several electric valves is ordinarily effected either by the electromotive force of the alternating current circuit 11, or, in case the circuit 11 is not connected to an independent source of electromotive force, by means of commutating capacitors connected between the several lines of the circuit 11. As stated above, however, when operating such an apparatus as a rectifier, it has not ordinarily been possible to draw a leading current from the alternating current circuit and when operating such apparatus as an inverter it has not ordinarily been possible to supply lagging loads on the alternating current circuit 11 without an inordinate amount of commutating capacitance. In the arrangement described above, however, it is seen that the auxiliary valve converting apparatus comprising the valves 22—27, inclusive, and the interphase windings 28—30, inclusive, is energized from the alternating current circuit 11 through a rotary phase-shifting transformer 34. The control grids are omitted from the valves of this apparatus and it is connected to supply a relatively high resistance load 32 which draws a substantially unity power factor load from the alternating current circuit 33. The magnetizing current of the magnetic member 21 is supplied by means of this auxiliary valve converting apparatus and there is induced in interphase windings 18, 19 and 20 interphase voltages which are equal and opposite to those of the interphase windings of the auxiliary valve converting apparatus. By exciting the control grids of the valves 12—17 inclusive from the alternating current circuit 33, so that the valve currents of the valves 12—17 are substantially in phase with the potential of the circuit 33 and the valve currents of the auxiliary converting apparatus, it has been found that the potentials induced in interphase windings 18, 19 and 20 by the auxiliary converting apparatus have the correct phase relations to commutate the current between the several valves 12—17 at required instants as determined by the grid excitation of these valves. From these considerations it is evident that the phase relations between the currents of the valves 12—17, inclusive, and the potentials of alternating current circuit 11 are immaterial, since the phase of the periodic commutating potentials produced by the auxiliary converting apparatus will vary in accordance with the phase of the valve currents of the main converting apparatus and substantially the maximum commutating potential will be available at the instants of commutation.

Operation of the above described apparatus as a whole under the various operating conditions will now be considered briefly. In case it is desired to transmit energy from the direct current circuit 10 to the alternating current circuit 11 and the alternating current circuit 11 is connected to an independent source of electromotive force, the phase of the grid potentials of electric valves 12—17, and hence the phase of the alternating current, may be controlled by means of the rotary-phase-shifting transformer 34. Since the auxiliary converting apparatus is also energized through this rotary phase-shifting transformer the commutating potential will vary in phase in accordance with variations in phase of the valve currents of the main converting apparatus so that the current may be supplied to the alternating current circuit 11 under any desired power factor conditions. In case the alternating current circuit 11 is not connected to an independent source of electromotive force, its power factor will, of course, be determined by the constants of the load circuit. In such a case, the alternating current circuit 33 may be energized from any suitable source of control potential of the desired frequency and the alternating current delivered to the load circuit 11 will, of course, be synchronous with it. In case it is desired to operate the apparatus as a rectifier transmitting energy from the alternating current circuit 11 to the direct current circuit 10, the average voltage of the direct current circuit may be controlled by means of the rotary phase-shifting transformer and at the same time the power factor of the alternating current circuit may be adjusted leading or lagging in accordance with the direction of rotation of the phase shifting transformer 34. As in the cases described above, the commutating potentials supplied by the auxiliary converting apparatus will vary in phase in accordance with the phase of the valve currents so as to have substantially its maximum value at the desired instants of commutation. As stated above, the load resistance 32 may be omitted and the output circuit of the auxiliary converting apparatus may be connected to feed energy into the direct current circuit 10.

Referring now to Fig. 2 of the drawings, there is illustrated a modification of my invention adapted to transmit energy from an alternating current circuit 40 at relatively high power factor to an alternating current circuit 41 of the same or a sub-multiple frequency at any desired power factor. This apparatus includes an electric valve rectifier consisting of a primary three-phase transformer winding 42 connected to the circuit 40 and a pair of secondary transformer windings 43 and 44, each provided with an electrical neutral interconnected through an interphase transformer winding 45. The winding 45 is provided with an electrical midpoint which forms the negative side of a direct current circuit 46 while the outer terminals of the windings 43 and 44 are connected to the other side of the direct current circuit 46 through electric valves 47 to 52 inclusive. The converting apparatus also includes an electric valve inverter comprising a pair of polyphase transformer windings 53 and 54 connected similarly to the windings 43 and 44, respectively, and provided with electrical neutrals interconnected through an interphase transformer winding 55. Windings 53 and 54 are associated with a polyphase secondary winding 56, connected to the alternating current circuit 41. The winding 55 is inductively coupled with the corresponding interphase winding 45 of the rectifying apparatus and is provided with an electrical midpoint which is connected to the positive direct current line 46. The outer terminals of the windings 53 and 54 are connected to the other side of the direct current circuit 46 through electric valves 57—62, inclusive. Each of the electric valves 47—52 and 57—62 are provided with an anode and a cathode and may be of any of the several types well known in the art, although I prefer to use valves of the vapor electric discharge type. The valves 57—62, inclusive, are also provided with control grids, by means of which the power factor at which energy is transmitted to the alternating current circuit 41 may be controlled. The control grids of the valves 57—62, inclusive, are connected to their common cathode circuit through the proper phase windings of a secondary winding of a grid transformer 63 and a current limiting resistor 64. The primary winding of grid transformer 63 may be energized from the alternating current circuit 40 and, in case it is desired to supply energy to the circuit 41 at a frequency which is a sub-multiple of that of the circuit 40, a frequency changer may be interposed in the connections comprising a synchronous motor 65 and synchronous generator 66. It will also be understood that, in case the circuit 41 is connected to an independent source of electromotive force synchronous with the circuit 40, the primary winding of the grid transformer may be energized from the alternating current circuit 41 through a rotary phase-shifting transformer as in the arrangement of Fig. 1, although in this case the valves 47—52 must also be provided with control grids energized from the same grid circuit so that the commutating potential produced in the winding 55 by means of the rectifying apparatus may have the proper phase relation for commutating the current between the valves 57—62 inclusive.

In explaining the operation of the above-described apparatus, it will be assumed that the circuit 41 is synchronous with the circuit 40 so that the frequency changer comprising the motor 65 and generator 66 may be neglected. Under these conditions, energy will be transmitted from the alternating current circuit 40 to the direct current circuit 46 through the electric valve rectifying apparatus and this current will be at substantially unity power factor on the alternating current circuit 40. During the operation of the apparatus a voltage will be impressed upon the winding 45 which, as is well understood by those skilled in the art, will be equal to the difference between the phase voltages of the conducting phases of the windings 43 and 44. Since the grids of the valves 57—62 are excited substantially in phase with the valve currents of the valves 47—52 inclusive, the potential induced in the winding 55, which is equal and opposite to that of the winding 45, will at all times be in such a direction as to effect a commutation between the several electric valves 57—62 inclusive, the phase relations being such that this commutating potential has substantially its maximum value at the several instants of commutation. Thus, assuming that the phase relation of the circuits 40 and 41 is fixed, the power factor at which energy is delivered to the circuit 41 may be controlled by controlling the phase relation of the alternating potential impressed upon the grids of valves 57—62, inclusive, and at the same time energy may be drawn from the circuit 40 at substantially unity power factor. In case the alternating current circuit 41 operates at a frequency which is a sub-multiple of that of the circuit 40, in which case the frequency changer comprising the motor 65 and generator 66 will excite the control grids of the valves 57—62 at the lower frequency, the operation is still substantially the same. In this instance, however, each impulse of the commutating potential induced in the winding 55 is not utilized, but only a fraction of the impulses. For example, when the frequency of the circuit 41 is half that of the circuit 40, alternate impulses of the commutating potential are utilized. When the frequency of the circuit 41 is one third of that of the circuit 40, only every third impulse will be used, etc.

In each of the cases described above, it will be noted that the grid potentials of the electric valves of the apparatus connected to the alternating current circuit whose power factor is to be controlled are substantially in phase with the valve currents of the auxiliary converting apparatus so that the commutating potentials produced by the interphase winding of the auxiliary apparatus will have the proper phase relation with respect to the valve currents of the main converting apparatus.

While I have described what I at present consider the preferred embodiments of my invention, it will be obvious to those skilled in the art that various changes and modifications may be made without departing from my invention, and I, therefore aim in the appended claims to cover all such changes and modifications as fall within the true spirit and scope of my invention.

What I claim as new and desire to secure by Letters Patent of the United States is:

1. In combination a supply circuit, a load circuit, one of said circuits being an alternating current circuit, an electric valve converting apparatus for transmitting energy therebetween including a plurality of electric valves and an interphase transformer comprising a magnetic core member provided with a plurality of parallel magnetic paths and a winding coupled with each of said paths, each of said windings being provided with an electrical midpoint connected to one terminal of said alternating current circuit and being connected across the other of said circuits through said valves, means for controlling the conductivity of said valves to control the power factor on said alternating current circuit, and means for commutating the load current between said valves under power factor conditions on said alternating current circuit which tend to oppose such commutation comprising means for producing in the windings of said interphase transformer a periodic potential, the frequency of which is an intergral multiple of that of said alternating current circuit.

2. In combination a supply circuit, a load circuit, one of said circuits being an alternating current circuit, an electric valve converting apparatus for transmitting energy therebetween including a plurality of electric valves and an interphase transformer comprising a magnetic core member provided with a plurality of parallel magnetic paths and a winding coupled with each of said paths, each of said windings being provided with an electrical midpoint connected to one terminal of said alternating current circuit and being connected across the other of said circuits through said valves, means for controlling the conductivity of said valves to control the power factor conditions on said alternating current circuit, and means for commutating the load current between said valves under power factor conditions on said alternating current circuit tending to oppose such commutation comprising means for producing in the windings of said interphase transformer a periodic potential having a frequency which is a harmonic of that of said alternating current circuit and variable in phase in accordance with the phase of the valve currents.

3. In combination, a supply circuit, a load circuit, one of said circuits being an alternating current circuit, an electric valve converting apparatus for transmitting energy therebetween including an interphase inductive winding and means for controlling the conductivity of the valves of the apparatus, a source of alternating current synchronous with said alternating current circuit, and a second electric valve converting apparatus energized from said source and provided with an interphase inductive winding coupled with that of said first mentioned valve converting apparatus to commutate the current between the valves thereof under any desired power factor conditions on said alternating current circuit.

4. In combination, a supply circuit, a load circuit, one of said circuits being an alternating current circuit, an electric valve converting apparatus for transmitting energy therebetween including an interphase transformer winding and means for controlling the conductivity of the valves of the apparatus, a source of alternating current synchronous with said alternating current circuit, and an electric valve rectifier connected similarly to said valve converting apparatus and energized from said source, said rectifier being provided with an interphase transformer winding inductively coupled to that of said converting apparatus for commutating the load current between the valves of said converting apparatus under any desired power factor conditions on said alternating current circuit.

5. In combination, a supply circuit, a load circuit, one of said circuits being an alternating current circuit of fixed frequency and wave form, an electric valve converting apparatus for transmitting energy between said circuits including an interphase inductive winding and means for controlling the conductivity of the valves of the apparatus, an electric valve rectifier provided with an interphase inductive winding inductively coupled to that of said converting apparatus, and means for energizing said rectifier with an alternating potential synchronous with that of said alternating current circuit and variable in phase with respect thereto whereby there is produced in said interphase winding a periodic potential for commutating the load current between the valves of said converting apparatus under any desired power factor conditions on said alternating current circuit.

6. In combination, a supply circuit, a load circuit, one of said circuits being an alternating current circuit, means for transmitting energy between said circuits comprising an electric valve converting apparatus including an interphase inductive winding and a plurality of electric valves each provided with a control grid, a source of alternating current synchronous with said alternating current circuit, an electric valve rectifier energized from said source and including an interphase inductive winding coupled to that of said converting apparatus, and means for exciting said control grids with periodic potentials substantially in phase with the corresponding valve currents of said rectifier, whereby the current may be commutated between the several valves of said converting apparatus under any desired power factor conditions on said alternating current circuit.

7. In combination, a supply circuit, a load circuit, one of said circuits being an alternating current circuit of fixed frequency and wave form, means for transmitting energy between said circuits comprising an electric valve converting apparatus including an interphase inductive winding and a plurality of electric valves each provided with a control grid, an electric valve rectifier provided with an interphase inductive winding inductively coupled to that of said converting apparatus, and means for energizing said rectifier and said control grids with an alternating potential synchronous with that of said alternating current circuit and variable in phase with respect thereto whereby there is produced in said interphase winding a periodic potential variable in phase in accordance with variations in the phase of the current through the valves of said converting apparatus for commutating the load current between said valves under any desired power factor conditions on said alternating current circuit.

8. In combination, a direct current supply circuit, an electrically independent alternating current load circuit, an electric valve converting apparatus for transmitting energy therebetween including an interphase inductive winding and a plurality of electric valves each provided with a control grid, a source of alternating current of the frequency which it is desired to supply said load circuit, means for exciting said control grids from said source, and an auxiliary electric valve rectifier energized from said source and provided with an interphase inductive winding coupled to that of said converting apparatus to produce therein a periodic potential for commutating the current between the valves of said converting apparatus when supplying a lagging load to said alternating current circuit.

9. In combination, a direct current supply circuit, an alternating current load circuit connected to an independent source of alternating current, an electric valve converting apparatus for transmitting energy therebetween including an interphase inductive winding and a plurality of electric valves each provided with a control grid, an auxiliary electric valve rectifier provided with an interphase inductive winding coupled to that of said converting apparatus, and means for deriving from said alternating current circuit a potential variable in phase with respect thereto for energizing said rectifier and exciting said control grids, whereby energy may be transmitted to said alternating current circuit under any desired power factor conditions.

10. In combination, an alternating current supply circuit, a direct current load circuit, a primary electric valve rectifier for transmitting energy therebetween including an interphase inductive winding and a plurality of electric valves each provided with a control grid, a secondary electric valve rectifier provided with an interphase inductive winding coupled to that of said primary rectifier, and means for deriving from said alternating current circuit a potential variable in phase with respect thereto for energizing said secondary rectifier and exciting said control grids, whereby energy may be transmitted to said direct current circuit under any desired power factor conditions on said alternating current circuit.

11. In combination, an alternating current supply circuit, an alternating current load circuit, and apparatus for transmitting energy between said circuits at substantially unity power factor on said supply circuit and any desired power factor on said load circuit comprising an electric valve rectifier energized from said supply circuit and including an interphase inductive winding, an electric valve inverter energized from the output of said rectifier and including an interphase winding coupled with that of said rectifier and a plurality of electric valves each provided with a control grid, and means for exciting said control grids substantially in phase with the corresponding valve currents of said rectifier, whereby there is induced in the interphase winding of said inverter a potential for commutating the current between the several valves thereof.

12. In combination, an alternating current supply circuit, and alternating current load circuit of a frequency equal to a sub-multiple of that of said supply circuit, and apparatus for transmitting energy between said circuits at substantially unity power factor on said supply circuit and any desired power factor on said load circuit comprising an electric valve rectifier energized from said supply circuit and including an interphase inductive winding, an electric valve inverter energized from the output of said rectifier and including an interphase winding coupled with that of said rectifier and a plurality of electric valves each provided with a control grid, and means for exciting said control grids with a periodic potential of the frequency of said load circuit and variable in phase substantially in accordance with the current of said supply circuit, whereby there is induced in the interphase winding of said inverter a potential for commutating the current between the several valves thereof.

CAMIL A. SABBAH.